(12) United States Patent
Simpson et al.

(10) Patent No.: US 7,675,878 B2
(45) Date of Patent: Mar. 9, 2010

(54) ENHANCED PASSIVE SCANNING

(75) Inventors: Floyd D. Simpson, Lake Worth, FL (US); Stephen P. Emeott, Rolling Meadows, IL (US); Brian K. Smith, Wellington, FL (US); Timothy J. Wilson, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 1222 days.

(21) Appl. No.: 10/938,149

(22) Filed: Sep. 10, 2004

(65) Prior Publication Data

US 2005/0128988 A1    Jun. 16, 2005

Related U.S. Application Data

(63) Continuation-in-part of application No. 10/674,984, filed on Sep. 30, 2003, now Pat. No. 7,583,643.

(51) Int. Cl.
*H04B 7/00* (2006.01)

(52) U.S. Cl. .................. 370/310.2; 370/312; 370/229; 370/338; 370/335; 370/336

(58) Field of Classification Search ............... 370/311, 370/310, 229, 338, 310.2, 312, 335, 336; 455/432.1
See application file for complete search history.

(56) References Cited

U.S. PATENT DOCUMENTS

| | | | |
|---|---|---|---|
| 5,548,818 A | 8/1996 | Sawyer et al. | |
| 5,794,146 A | 8/1998 | Sevcik et al. | |
| 5,920,549 A | 7/1999 | Bruckert et al. | |
| 5,920,597 A | 7/1999 | Khayrallah et al. | |
| 5,987,012 A | 11/1999 | Bruckert et al. | |
| 6,430,395 B2 | 8/2002 | Arazi et al. | |
| 6,804,542 B1 | 10/2004 | Haartsen | |
| 7,110,779 B2 * | 9/2006 | Billhartz et al. | 455/456.2 |
| 2002/0116460 A1 | 8/2002 | Treister | |
| 2002/0176445 A1 | 11/2002 | Melpignano | |
| 2003/0177267 A1 * | 9/2003 | Orava et al. | 709/245 |
| 2003/0214905 A1 * | 11/2003 | Solomon et al. | 370/229 |
| 2004/0060985 A1 | 4/2004 | Feng | |
| 2004/0090929 A1 * | 5/2004 | Laux et al. | 370/311 |
| 2004/0105420 A1 | 6/2004 | Takeda et al. | |
| 2004/0120278 A1 | 6/2004 | Krantz et al. | |
| 2004/0166897 A1 | 8/2004 | Hamada | |

(Continued)

OTHER PUBLICATIONS

United States Patent and Trademark Office, Notice of Allowance and Fee(s) Due for U.S. Appl. No. 10/674,984, Nov. 20, 2008, 4 pages.

(Continued)

*Primary Examiner*—Vincent P Harper
*Assistant Examiner*—Fred A Casca
(74) *Attorney, Agent, or Firm*—Sylvia Chen; Scott M. Garrett

(57) ABSTRACT

This application describes an enhanced passive scanning method for a wireless local area network, including the steps of transmitting at least one of a beacon signal or a gratuitous probe response in a WLAN channel by an access point. The gratuitous probe response is a supplemental beacon signal that is transmitted at intervals between the occurrence of regular beacon signals, but contains only essential information to allow mobile station manage roaming and timing.

15 Claims, 7 Drawing Sheets

U.S. PATENT DOCUMENTS

| | | |
|---|---|---|
| 2004/0167988 A1 | 8/2004 | Rune et al. |
| 2004/0190477 A1 | 9/2004 | Olson et al. |
| 2004/0205158 A1 | 10/2004 | Hsu |
| 2004/0249906 A1 | 12/2004 | Olbricht et al. |
| 2005/0009548 A1 | 1/2005 | Kelley et al. |
| 2005/0068928 A1 | 5/2005 | Smith et al. |

OTHER PUBLICATIONS

United States Patent and Trademark Office, Notice of Office Communication for U.S. Appl. No. 10/674,984 (Final Fourth Office Action), Apr. 21, 2008, 10 pages.

United States Patent and Trademark Office, Notice of Office Communication for U.S. Appl. No. 10/674,984 (Non-Final Third Office Action), Jul. 11, 2007, 10 pages.

United States Patent and Trademark Office, Notice of Office Communication for U.S. Appl. No. 10/674,984 (Final Second Office Action), Jun. 4, 2007, 9 pages.

United States Patent and Trademark Office, Notice of Office Communication for U.S. Appl. No. 10/674,984 (Non-Final First Office Action), Jan. 12, 2007, 10 pages.

Patent Office of the People's Republic of China, "Notification of the First Office Action" for Patent Application No. 200480028484.5, Feb. 15, 2008, pp. 1-10.

Korean Intellectual Property Office, "Notice of Preliminary Rejection" for application No. 10-2006-7006266, May 14, 2007, pp. 1-6.

Patent Cooperation Treaty, "Notification of Transmittal of the International Search Report and the Written Opinion" for International Patent Application No. PCT/US2004/31715, Fec. 10, 2005, pp. 1-7.

Patent Cooperation Treaty, "Notification Concerning Transmittal of Copy of International Preliminary Report on Patentability" for International Patent Application No. PCT/US2005/032278, Mar. 22, 2007, pp. 1-7.

* cited by examiner

200

ENHANCED PASSIVE SCANNING

CROSS REFERENCE

This application is a continuation in part of U.S. patent application Ser. No. 10/674,984, filed Sep. 30, 2003, titled "ENHANCED PASSIVE SCANNING," commonly assigned, and claims the benefit of the filing date of that application.

FIELD OF THE INVENTION

This invention relates generally to methods of operating wireless communication systems and wireless local area networks. More specifically, the invention relates to scanning methods for establishing communications between a mobile station and an access point.

BACKGROUND OF THE INVENTION

Wireless local area networks (WLANs) typically transmit via radio or infrared frequencies to connect data devices. In a WLAN, the wireless communication devices are often mobile, moving around more or less freely within the networked area. WLANs combine with infrastructure networks systems that can be connected to the Internet, thereby providing communication over long distances.

WLANs link portable and wireless computer devices, also called mobile stations or terminals, to a wired network via a plurality of fixed access points (APs), also called base stations. Allowing WLAN devices to communicate with the infrastructure network, access points provide for wireless communications within respective cells and are typically spaced throughout a designated networked area. The access points facilitate communications among a networked set of 802.11-compliant devices called a basic service set (BSS), as well as communications with other BSSs and wired devices in or connected to wired infrastructure network systems.

WLANs have been used in proprietary business applications such as order entry, shipping, receiving, package tracking, inventory, price-markdown verification, and portable point of sale. Such systems may have an operator carrying a handheld computer device that communicates with a server via one or more access points such as a wireless bridge or router, each access point interacting with the server to create a wireless cell.

The most common WLAN technologies are described in the Institute of Electrical and Electronics Engineer's IEEE 802.11 family of industry specifications, which include two physical-layer standards: 802.11b operating at 2.4 GHz and delivering up to 11 Mbps at 250 feet maximum; and 802.11a operating at 5 GHz and delivering up to 54 Mbps at 150 feet maximum. A third standard, 802.11g, which provides the speeds of 802.11a at the distances of 802.11b, is scheduled for finalization in late 2003. IEEE 802.11 specifies Carrier Sense Multiple Access with Collision Avoidance (CSMA/CA) for devices operating within an 802.11 wireless network. Informative material may be found in IEEE Std. 802.11-1999, Part 11: Wireless LAN Medium Access Control (MAC) and Physical Layer (PHY) Specifications, reference number ISO/IEC 8802-11:1999, ANSI/IEEE Std. 802.11, 1999 edition, 1999.

When a wireless device moves around a WLAN, it may need to change its present association from one access point to another if the reception level of the presently associated access point becomes too low, and a different access point provides a higher reception level. The procedure, known as roaming, allows a WLAN device to switch association among access points, a change that is generally based on the relative reception levels of the access points involved. Roaming procedures may be based on selected configuration settings for the access points (APs), such as density levels of cell sizes that influence their defer, carrier-detect, and cell-search behaviors. The term "roaming" as used here in association with WLAN systems, has a different meaning than in cellular telephony systems. In cellular telephony systems the term roaming refers to a subscriber unit traveling out of a home network service area and into a non-home network service area, where the operators of the home and non-home networks have an agreement to provide communication service to each other's subscribers. In WLAN systems, roaming refers to changing the presently associated access point providing wireless network service, which is more analogous to "hand off" between serving cells in a cellular telephony systems.

Within the wireless networks, wireless communications are generally managed according to an operating protocol that requires ongoing wireless activity to monitor the roaming of WLAN devices and to synchronize radio timing between these portable devices and access points. This ongoing activity contributes to the draining of power from battery-powered WLAN devices. Synchronization of radio timing becomes especially critical in the management of wireless communications, and more efficient scheduling of future coordinated activities provides better power-saving strategies since it allows the mobile WLAN device to conserve power between times when it must receive or transmit.

Before a WLAN device can communicate with other devices in a given WLAN, it must first locate access points. The medium access control (MAC) layer-2 protocol of the IEEE 802.11 manages, coordinates and maintains communications, traffic, and data distribution in wireless networks that have fixed access points, or in ad hoc networks. The IEEE 802.11 MAC protocol defines beacon frames sent at regular intervals known as beacon intervals, which may be transmitted, for example, every 100 milliseconds by an access point. The beacons allow WLAN devices to monitor for the presence of the access point. Passive and active scanning techniques have been developed for WLAN devices to detect access points, although the 802.11 standard does not mandate particular methods for scanning.

Passive scanning allows the network interface card (NIC) of a WLAN device to find an IEEE 802.11 network by listening for traffic. By listening it is meant monitoring a known channel, and determining if there is a signal present on the channel. As defined in 802.11, passive scanning involves a WLAN device listening to each frequency channel for no longer than a maximum duration defined by the ChannelTime parameter. In this passive mode, the wireless NIC listens for beacons and probe responses while extracting information about the particular channel. Passive scanning expends time and battery power while listening for a beacon frame that may never occur or may be on an idle channel.

The ChannelTime is configured during the initialization stage of the WLAN device driver. To initiate a passive scan, the driver commands the firmware to perform a passive scan with a list of channels. The firmware sequences through the list of channels and sends any received frames to the driver. The amount of time spent on the channel is equal to the ChannelTime value. The driver is able to abort the passive scan when the desired beacon or probe response is received.

Active scanning, in contrast to passive scanning, requires the scanning wireless NIC to transmit a probe request, and receive probe responses from other 802.11 wireless NICs and access points. Active scanning allows the mobile wireless NIC to interact with another wireless NIC or access point based on probe requests and probe responses.

The active scanning of the IEEE 802.11 MAC uses a set of management frames including probe request frames that are sent by a WLAN device and are followed by probe response frames sent by an available access point. In this way, a WLAN device may scan actively to locate an access point operating on a certain channel frequency and the access point can indicate to the WLAN device what parameter settings it is using.

In an active scan, the WLAN device transmits a probe request frame including a service set identifier, and if there is a access point on the same channel that matches the service set identity (SSID) in the probe request frame, the access point will respond by sending a probe response frame to the WLAN device. The probe response includes information the WLAN device uses to access the network. The WLAN device processes the beacon frames and any additional probe responses that it may receive.

Once the various responses are processed or it has been determined that no response has been received within a prescribed time, a WLAN device may continue to scan on another radio channel. At the end of the scanning process, the WLAN device has accumulated data about the networks in its vicinity, and the device can determine which network to join. When compared to passive scanning, active scanning results in longer battery life for the WLAN device, but it also reduces network capacity.

After passive or active scanning, a WLAN device registers itself with an access point (AP) of the chosen network, synchronizes with the AP and, thereafter, transmits and receives data to and from the AP. According to the IEEE 802.11 standard, the registration includes an authentication whereby the AP identifies whether a WLAN device has permission to access the wireless network via a medium access control (MAC) layer. Generally, this authentication phase requires bi-directional authentication steps with the AP and WLAN device exchanging some packets, and optionally, may include additional steps of assertion of identity, challenge of assertion, and response to challenge. After authentication, the WLAN device establishes a connection link with the AP by sending an association request packet to the AP and waiting to receive a response frame from the AP that acknowledges the association. The WLAN device joins a basic service set (BSS) by setting its local hopping time and channel sequence according to the information contained in the AP beacon.

The AP is the timing master of the network, performing a TSF (timing synchronization function) to keep the timers for all WLAN devices synchronized within the same basic service set (BSS) of a larger network. The beacons that are broadcast at fixed time intervals by the AP contain copies of the TSF timer and hopping sequence to synchronize other WLAN devices in a BSS. When a timestamp of a device's TSF timer is different from the timestamp in the received beacon frame, the WLAN device resets its timestamp value to match the received timestamp value.

Providing more reliable and stable communication links for a wireless network depends in part on improving the management of network traffic and decreasing interference among networks devices and other networks. Access points typically execute a hopping pattern, one of the 66 hopping patterns being specified in the IEEE 802.11 draft standard, with hops across non-overlapping frequencies at a rate of, for example, one hop every 100 milliseconds. According to the IEEE 802.11 wireless LAN standard of Frequency Hopping Spread Spectrum (FHSS), the bandwidth used for radio frequency (RF) transmissions is between 2.40 GHz and 2.50 GHz among the 79 channels that are regulated by the Federal Communications Commission (FCC) and used in the U.S. and Canada. Frequency hopping spread-spectrum systems may be selected over direct sequence spread spectrum (DSSS) to minimize interference and increase network capacity.

Other wireless technologies such as Bluetooth for Wireless Personal Area Networks (WPANs) also employ scanning methods. WPAN networks can use spread spectrum techniques that improve transmission reception quality by using fast or slow frequency hopping and direct sequence spread spectrum, the fast frequency hopping changing the frequency more quickly than the modulation rate. A method of communication between access-point devices and mobile devices using the IEEE 802.15 Bluetooth standard is described in "Radio Communication Arrangements," Melpignano, U.S. patent application No. 2002/0176445 published Nov. 28, 2002. One of the devices enters into a page-scan state where it can receive transmissions on a particular page-scan frequency from another device that transmits a page train. The page train is based in part on an estimate of the page-scan frequency that is determined after communications have occurred between the devices, and the second device has transmitted a page train to the first device. Under predetermined circumstances, the page train is modified and preferably truncated to start on a frequency shifted to correspond to the estimate.

An example of a method by which management functions are transferred among participant devices using Bluetooth page-train procedures is described in "Approach for Managing Communications Channels Based on Performance and Transferring Functions between Participants in a Communications Arrangement," Treister et al., U.S. patent application No. 2002/0116460 published Aug. 22, 2002. This communication arrangement uses a scan list and timing information to reduce the amount of time spent in acquiring a new management device or access point.

Various methods have been designed to create synchronous and cellular-like communication between devices using Bluetooth and other wireless communication protocols. One proposed method for providing a handoff of sessions between access points while a device is roaming is described in "Wireless Private Branch Exchange (WPBX) and Communicating Between Mobile Units and Base Stations," Arazi et al., U.S. Pat. No. 6,430,395 issued Aug. 6, 2002. The method synchronizes a mobile device and a switch having small coverage area.

The total time that is consumed for devices using IEEE 802.11 WLAN and other wireless communication technologies to complete all the steps of scanning, authentication and association can vary greatly. Thus, improving the scanning process for wireless networks would help the establishment of a connection between devices and the communication within a network to become more predictable, as well as to become more power and time efficient, particularly for battery-powered IEEE 802.11 WLAN devices. More effective programming techniques for scanning would minimize the number of probe requests generated, the amount of time the receiver of the device is set to an on-state, and the number of times the firmware is interrupting a host controller for beacon processing. Thus, the improved scanning system would increase the battery life of a WLAN device, because the device would need less time to scan or monitor for beacon signals from a primary as well as neighboring access points. In addition, improvements of the scanning system for a WLAN network would benefit associated networks such as wide area networks (WAN), personal area networks (PAN), and controller area networks (CAN). Furthermore, some WLAN frequency bands are shared with certain radar bands. As such, WLAN devices are not allowed to transmit, such as by using active probe scanning. Therefore there exists a need by passive scanning may be performed in a manner that least impacts battery life, and still allows mobile stations to detect the presence of an access point quickly.

BRIEF DESCRIPTION OF THE DRAWINGS

Various embodiment of the present invention are illustrated by the accompanying figures, wherein.

DETAILED DESCRIPTION OF THE PRESENTLY PREFERRED EMBODIMENTS

Figure 1:
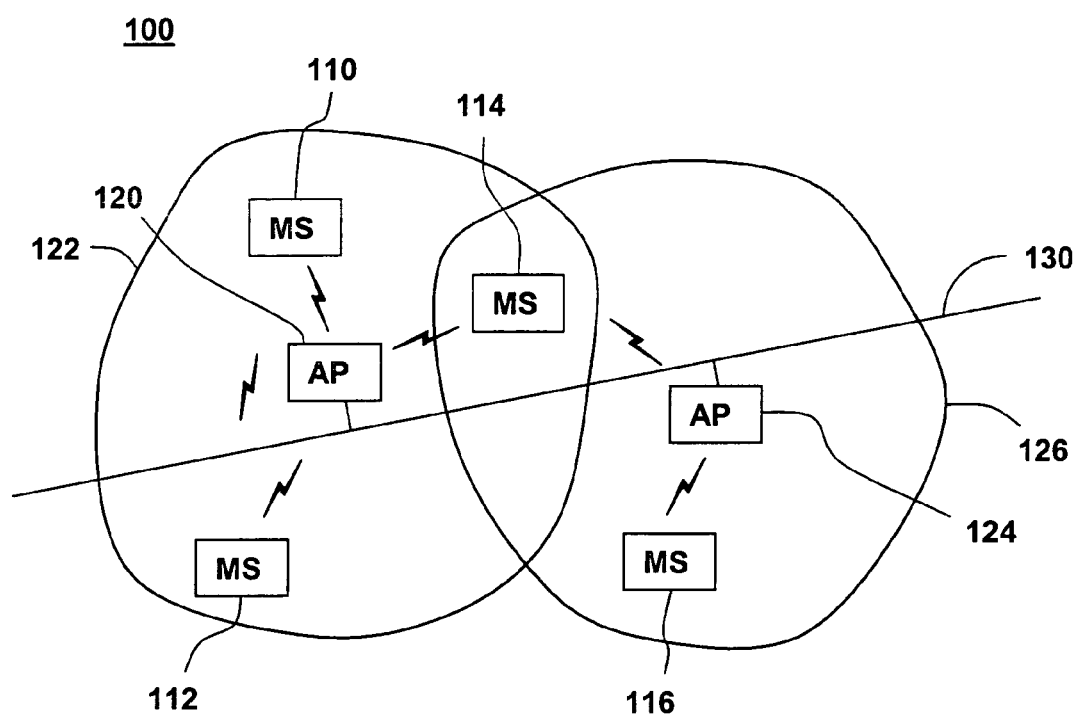
FIG. 1 illustrates an enhanced passive scanning system for a wireless local area network, in accordance with one embodiment of the current invention.

FIG. 1 shows an enhanced passive scanning system for a wireless local area network (WLAN), in accordance with one embodiment of the present invention at 100. WLAN 100 includes one or more wireless communication devices referred to herein as mobile stations 110, 112, 114 and 116, and one or more access points 120 and 124. Access points 120 and 124 may be connected to an infrastructure network 130, which in turn may be connected to other wired and wireless networks (not shown). Mobile stations 110, 112, 114 and 116 include radio transmitters and receivers for transmitting and receiving signals such as voice over IP, data packets, control frames, and network management frames. Mobile stations 110, 112, 114 and 116 can communicate wirelessly with access points 120 and 124, and can be set to communicate with each other. In one embodiment, two mobile stations 110 and 112 form an ad hoc network with the ability to establish communications when in close proximity to each other. Often, one or more mobile stations 110, 112 and 114 will connect wirelessly to an access point 120, using standardized protocols such as IEEE 802.11, commonly referred to as Wi-Fi. These industry standards allow communication channels to be established and maintained between combinations of mobile stations and access points for the transmission of digital information by using techniques such as carrier-sense multiple access protocol with collision avoidance (CSMA/CA) to help provide rapid, equitable connectivity for all stations.

Due in part to battery power limitations, the transmission range for reliable communications between mobile stations and access points is limited. Often within a well-configured wireless LAN, a mobile station may be within range of more than one access point, and the access point to which the mobile station connects needs to be determined. By connects it is meant that the mobile station uses the access point for wireless communication. For example, mobile station 110 is connected to access point 120, sometimes referred to as the serving access point. Mobile station 114, however, may be connected to either access point 120 or access point 124, with one of the access points 120, 124 acting as the serving AP while the other is what can be referred to as a neighboring AP. As mobile station 114 moves or roams, or as environmental conditions for radio transmissions change, the serving AP may be changed accordingly.

Access point 120 has a transmission range 122 within which data transmissions can be sent to and received from one or more mobile stations 110, 112, and 114, or the network 130. Similarly, access point 124 has a transmission range 126 within which data transmissions can be sent to and received from one or more mobile stations 114 and 116, as well as the network 130. To begin the process of connecting with a mobile station, an AP transmits, for example, a beacon signal on a prescribed channel. The prescribed channel comprises a prescribed frequency or frequency band that can be received by any mobile station within the transmission range when the mobile station is appropriately tuned and ready to receive the transmission. The beacon signal, commonly referred to as the beacon, comprises, for example, an access-point timestamp, a beacon interval, a basic service set identifier (BSSID), and a traffic indication map (TIM). The access-point timestamp contains timer information from the serving AP such as a copy of the AP's TSF timer to be used for synchronizing time-sensitive operations. The beacon interval indicates the time between two targeted start times of a beacon signal. In one embodiment, the beacon interval is substantially 1024 microseconds. The BSSID is an identifying name assigned to the local network comprising the mobile stations and the APs serving the mobile stations. The traffic indication map, an information element present within beacon frames generated by APs, contains a DTIM count that indicates how many beacons will appear before the next DTIM, a DTIM period indicating the number of beacon intervals between successive DTIMs, a bitmap control field that provides an indication of broadcast or multicast frames buffered at the AP, and a traffic-indication virtual bitmap containing information corresponding to traffic buffered for a specific station within the BSS that the AP is prepared to deliver at the time the beacon frame is transmitted. The DTIM is a beacon signal that contains a delivery traffic information message (DTIM) after which an AP sends out buffered broadcast and multicast media access control (MAC) service data units (MSDU), followed by any unicast frames. The beacon signal may also include within the beacon frame fields containing information such as capability information, supported rates, and parameters related to frequency hopping (FH) or direct sequence spread spectrum (DSSS) physical layers (PHYs).

In addition to beacon signals, gratuitous probe responses (GPRs) may be periodically received at a mobile station from an AP. The received GPR includes, for example, an access-point timestamp, a gratuitous probe response interval, and a basic service set identifier. Similar to the beacon signal, the GPR contains timing and synchronization information from the serving AP though omits the potentially lengthy TIM and other information contained in the beacon frame. Because GPR frames are shorter than beacon frames, transmission and reception of GPR frames lessens the load on the network, and GPRs can be sent much more frequently than beacon signals. Gratuitous probe response frames, sometimes referred to as unsolicited probe responses, contain similar information as probe response frames, though do not require the generation and transmission of an asynchronous probe request frame from the mobile station and contain non-standard information elements such as the GPR interval. Eliminating the need to send probe requests thereby reduces power consumption within the mobile station. Elimination of probe requests from potentially many mobile stations connected to the AP reduces load on the network and increases overall capacity.

The mobile station can reduce its power consumption by generating and executing an enhanced passive scanning schedule that is based on timing information received from beacon signals and GPRs and stored in its site timing table (STT). The STT has a site timing table entry corresponding to each serving AP and any neighboring APs. The mobile station receives beacon signals and GPRs from selected channels with a radio transmitter/receiver within the mobile station, and then an AP can be selected and connected to as the serving AP based on collected transmission measurements such as the received signal strength indicator (RSSI) and other AP information from the received beacon signals and GPRs.

The site timing table entries may be created, updated and removed based on the received beacon signals and GPRs. The STT and the site timing table entries may be created, updated and removed, for example, by a controller and a memory located within the mobile station. Using site timing table entry information in the STT, an enhanced passive scan schedule may be generated. The enhanced passive scan schedule may include a channel number, a local scan start time, and a maximum channel scan time for each site timing table entry. A scan start time is determined and set based on entries in the updated STT. Based on the scan start time, a power mode such as an active mode or a low-power mode may be determined for the mobile station. To minimize power consumption, the mobile station may enter into the low-power mode when sufficient time remains prior to receiving an anticipated beacon signal or GPR.

Computer program code for enhanced passive scanning may reside within any suitable computer usable medium such as read-only memory, random access memory, internal memory, external memory, flash memory, semiconductor memory, magnetic media, optical memory, compact discs, digital versatile discs, a memory storage device, and combinations thereof. A program for enhanced passive scanning may be stored or loaded into a computer usable medium within a mobile station. The program may include code to scan at least one channel for a beacon signal or a GPR; to receive beacon signals and GPRs; to create and update an entry in an STT based on the beacon signals and GPRs; to generate an enhanced passive scan schedule; to set a scan start time based on entries in the updated STT; to determine a power mode for the mobile station based on the scan start time; and to select an access point.

Figure 2:
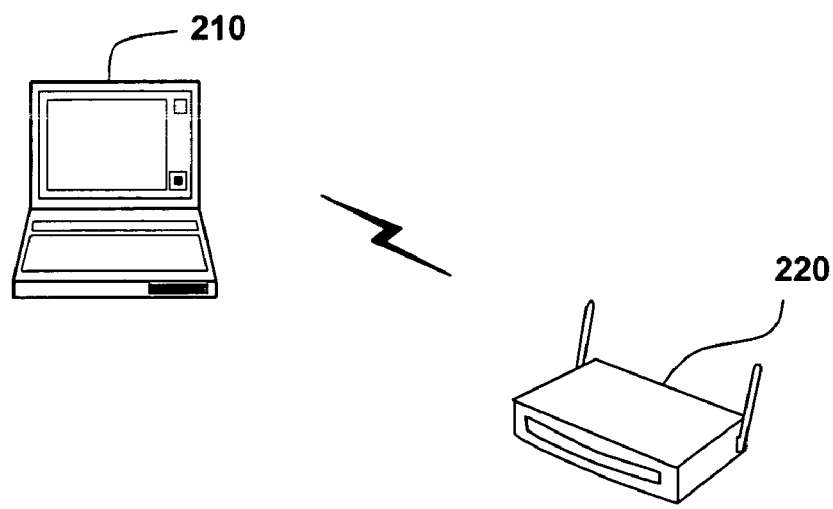
FIG. 2 illustrates an enhanced passive scanning system for a wireless local area network, in accordance with another embodiment of the current invention.

FIG. 2 illustrates an enhanced passive scanning system for a wireless local area network, in accordance with another embodiment of the present invention. Enhanced passive scanning system 200 includes a mobile station 210 and an access point 220 that may be connected to other wired or wireless networks. Mobile station 210, such as a laptop, a personal digital assistant (PDA), a mobile phone, a cellular phone, or other wireless communication device, can communicate with access point 220 to exchange digital information such as data packets, voice-over-IP, network management frames and control messages. The radio transmitter/receiver within the mobile station contains a scanner for scanning one or more channels for beacon signals and GPRs. Mobile station 210 may be fitted with a wireless network interface card (NIC) or have a built-in radio transmitter/receiver to scan and receive a beacon signal or a GPR from access point 220. Mobile station 210 has suitable hardware and software to create and update a site timing table for generating an enhanced passive scan schedule and setting scan start times for the reception of beacon signals and GPRs, to select an access point when more than one AP is within transmission range, and to determine a power mode for the wireless communication device.

Figure 3:
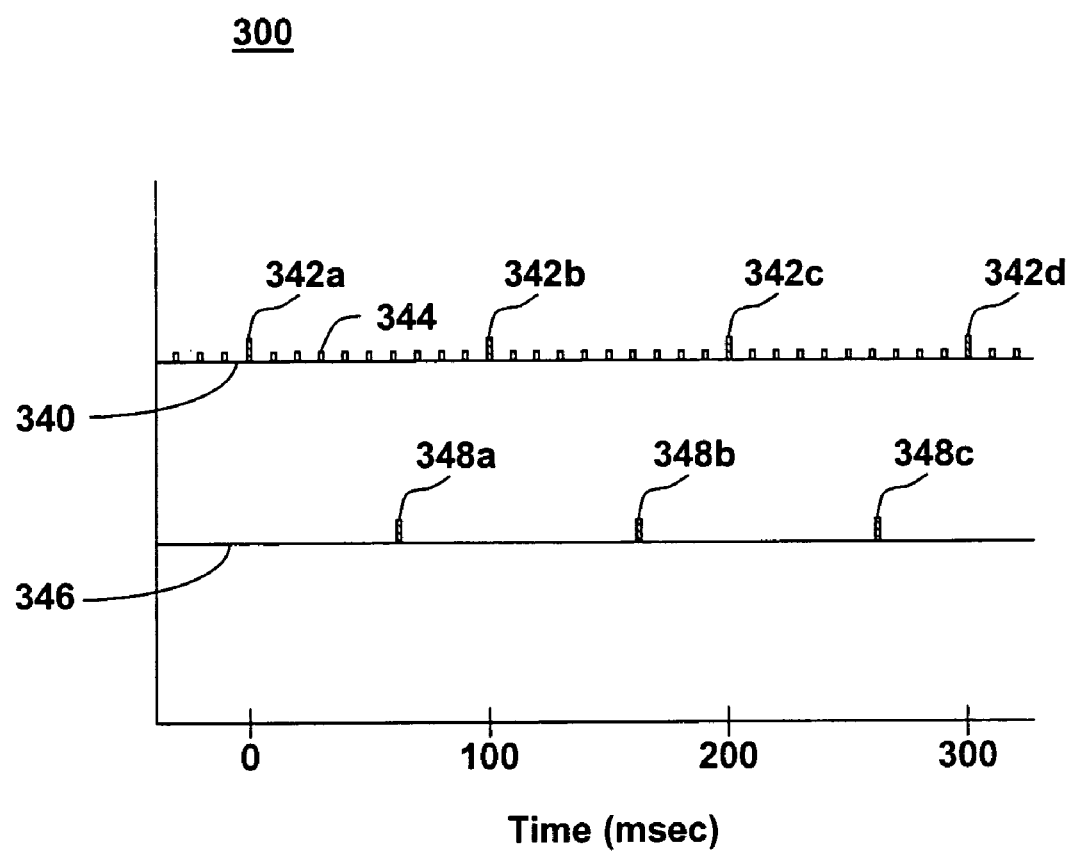
FIG. 3 is a plot of beacon signals and gratuitous probe responses transmitted from two access points, in accordance with one embodiment of the current invention.

FIG. 3 shows a plot of beacon signals and gratuitous probe responses transmitted from two access points, in accordance with one embodiment of the present invention at 300. This exemplary radio transmission 340, which includes periodic beacon signals 342a, 342b, 342c and 342d with a beacon interval of about 100 milliseconds, is received from a first access point. Although beacon signals are intended to be transmitted at the end of each beacon interval, individual beacon signals may be delayed because of a transmission of high-priority voice packets or data packets, a transmission of a long frame that extends past a target beacon transmission time (TBTT), or other traffic on the medium. The beacon intervals may range, for example, between one timing unit (TU) of 1,024 microseconds to over 65,000 TUs. As discussed earlier, a short beacon interval is undesirable in some circumstances because of the potentially large size of the beacon TIM and DTIM information elements. In this example, beacon signals with DTIM elements are scheduled every three beacon signals, such that beacon signals 342a and 342d contain DTIM messages.

In accordance with some protocols, a mobile station may send a probe request to an access point, which in turn sends back a probe response, the request and response thereby enabling synchronization between the mobile station and the access point as well as the broadcasting of multicast and unicast messages. In the case where many mobile stations, such as fifty mobile stations, are being served by a single access point, a large number of probe requests may be generated, which may slow down the network and generate an unnecessary drain of power within the mobile stations. To help conserve battery power and network resources, gratuitous probe responses can be interjected between beacon signals to provide the mobile stations with needed information in a more schedulable manner such that any individual mobile station may be powered up into an active mode to receive a beacon signal or a GPR at a target beacon transmission time or a target gratuitous probe response transmission time.

A series of gratuitous probe responses 344 may be injected periodically between beacon signals on radio transmission 340. For example, a GPR is transmitted by the serving AP every five or ten milliseconds.

Serving APs and neighboring APs in any network combination may be set to send a GPR at a target GPR transmission time as well as a beacon signal at a target beacon transmission time. The transmission of any individual beacon signal or a GPR may be delayed occasionally, for example, by the transmission of high-priority data or voice packets, with subsequent beacon signals and GPRs transmitted close to the initial target transmission times. For example, radio transmission 346 from a neighboring AP includes beacon signals 348a, 348b and 348c with beacon signal 348c containing a DTIM frame without injected GPRs, whereas radio transmission 340 from a serving AP includes beacon signals 342 with interjected GPRs 344. The transmission and reception of beacon signals and GPRs may be established to effectualize a reduction in power consumption and an improvement in network capacity.

Figure 4:
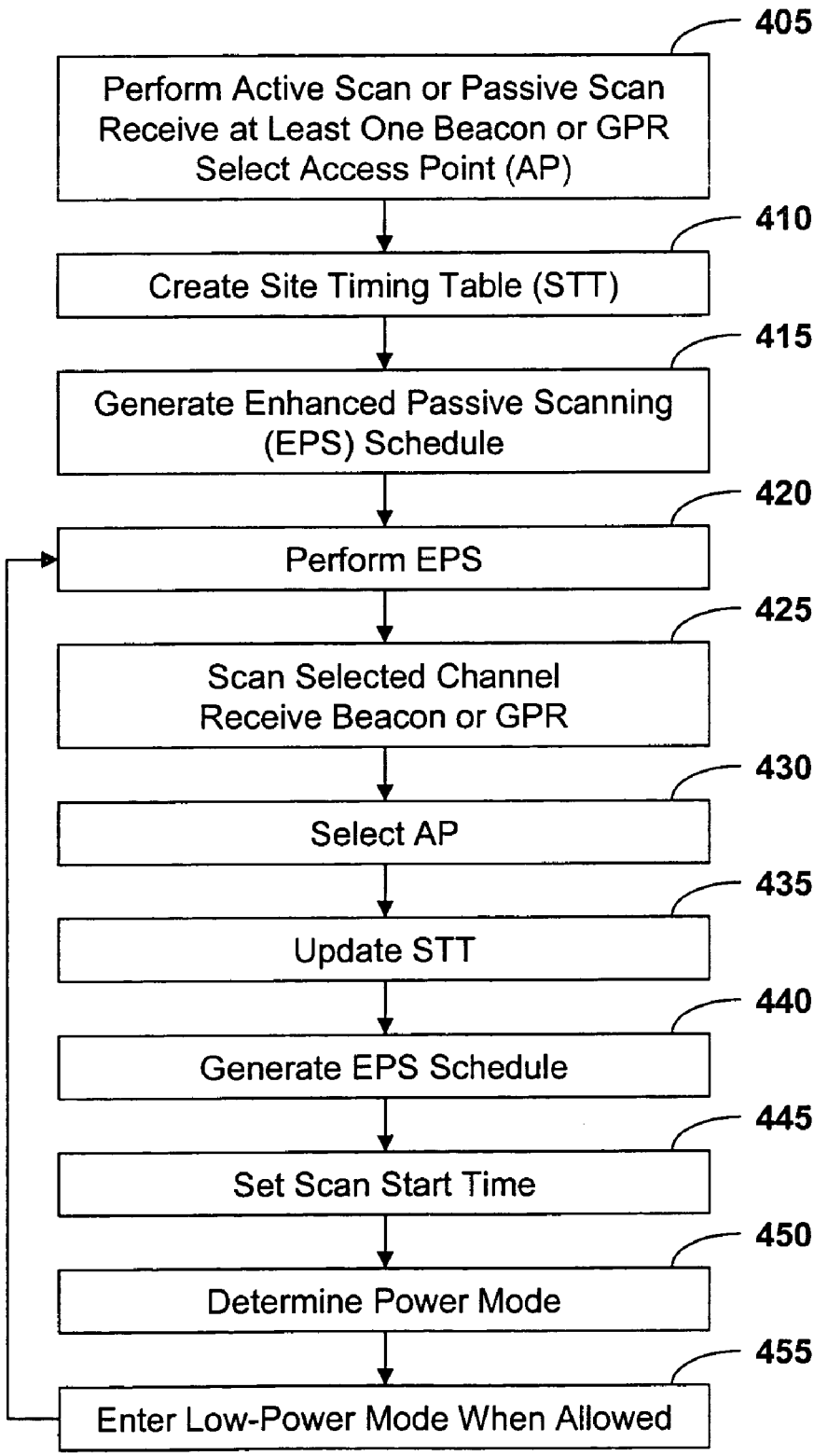
FIG. 4 is a flow diagram of an enhanced passive scanning method for a wireless local area network, in accordance with one embodiment of the current invention.

FIG. 4 shows a flow diagram of an enhanced passive scanning (EPS) method for a wireless local area network, in accordance with one embodiment of the present invention at 400. EPS method 400 includes various steps to initiate and operate a wireless communication network using GPRs.

Enhanced passive scanning method 400 may be initiated by first performing an active scan or a passive scan, as seen at block 405. An active scan includes the mobile station generating probe request frames and processing probe response frames sent from an access point or another mobile station. Passive scanning includes the mobile station listening to a channel for up to a maximum duration defined by a channel time parameter, then scanning on each designated channel for traffic such as a beacon signal or a GPR. The access point is programmed to generate and send a GPR from an access point. After the active or passive scan, at least one beacon signal or GPR is received. The beacon signal includes, for example, an access-point timestamp, a beacon interval, a basic service set identifier, and a traffic indication map. The GPR includes, for example, an access-point timestamp, a GPR interval, and a basic service set identifier. An access point may be selected based on the received beacon signals or GPRs. In a more specific example, the AP is selected based on the signal quality or the signal strength of the received transmissions. When the AP is selected, the selected AP becomes the serving AP until another AP is selected. In the case of an ad hoc network with two or more mobile stations, one of the mobile stations can be established as the sender of beacon signals and GPRs.

A site timing table may be created based on the beacon signals or GPRs and other access point information received during the active or passive scan, as seen at block 410. The site timing table is created with at least one site timing table entry. In one example, site timing table information is appended to a station management table (SMT) that includes entry management fields, AP selection fields, and status information.

Site timing table information is obtained by tuning the mobile station to an access point channel, receiving a beacon signal or a GPR, collecting transmission measurements of the access point, and storing access point information in the site timing table. Transmission measurements are made, for example, of received signal strength, estimated noise power values, quality-of-service measurements, frame error rates, or other determiners of channel clarity and availability.

With information from the site timing table, an enhanced passive scan schedule may be generated, as seen at block 415. The enhanced passive scan schedule includes, for example, a channel number, a local scan start time, and a maximum channel scan time for each site timing table entry in the site timing table.

An enhanced passive scan is performed with information in the site timing table and the EPS schedule, as seen at block 420. Channels are scanned for beacon signals and GPRs from APs that are within range of the mobile station.

At the target beacon transmission time or at a target GPR transmission time, at least one channel is scanned for a beacon signal or GPR, as seen at block 425. The transmitter/receiver in the mobile station is tuned to an access point channel to receive a beacon signal or a GPR. When the transmitter/receiver is powered down, time is allocated to wake up and warm up the radio before the transmitter/receiver receives the beacon signal or GPR at the target transmission time. When the transmitter/receiver is tuned to the selected channel, a beacon signal or a GPR may be received. When a beacon signal or GPR is received, the next channel may be scanned. The beacon signal or the GPR may be received from an access point or another mobile station in an ad hoc network.

Based on the received beacon signal or GPR, a different access point may be selected, as seen at block 430. The mobile station is connected to the selected access point. Alternatively, access point selection may occur after creating or updating the site timing table, or at other appropriate points during the EPS.

With information received from the beacon signal or the GPR, entries within the site timing table may be updated, as seen at block 435. Entries in the site timing table, such as an access-point timestamp, a local station timestamp, a beacon interval or a GPR interval, are updated according to information received from the beacon signal or the GPR. The local station timestamp comprises local station timing information, which may include the time when the first byte of the beacon signal or the GPR frame was received. In some cases, entries within the site timing table will be added when the mobile station comes within the range of another access point. In other cases, site timing table entries will be removed when the mobile station goes out of range of an access point.

The EPS schedule is generated with the updated information in the site timing table, including a channel number, a local scan start time, and a maximum channel scan time for each site timing table entry in the site timing table, as seen at block 440. The local scan start time can be calculated, for example, from the access-point timestamp, the local station timestamp, and the beacon or GPR interval. The maximum channel scan time may be set differently for each channel, and may be dynamically adjusted while the EPS is performed in order to accommodate, for example, a constantly busy channel or an excessive amount jitter in the actual beacon signal or GPR transmission time received over a given channel.

Based on entries in the updated site timing table, a scan start time is set, as seen at block 445. The scan start time may be set, for example, based on the EPS with chronologized channel information such that the next anticipated beacon signal or GPR transmission can be received. A maximum scan time for each channel being scanned may be determined based on entries in the updated site timing table.

A power mode may be determined based on the scan start time, as seen at block 450. When sufficient time exists prior to the next anticipated beacon signal or GPR transmission, the mobile station may be placed into a low-power mode to minimize power consumption. For example, a calculation is made for a time period remaining until a target beacon transmission time or a target gratuitous probe response transmission time is scheduled. Based on the calculation and other time considerations such as wake-up time, the mobile station may enter the low-power mode.

When time allows, the low-power mode is entered, as seen at block 455. For example, a low-power timer is set based on the scan start time and wake-up time required to receive beacon signals and GPRs. When the low-power timer expires, the mobile station exits the low-power mode. Whether or not the mobile station enters the low-power mode, enhanced passive scanning is continued as seen back at block 420 in accordance with the EPS schedule generated from the site timing table.

Figure 5:
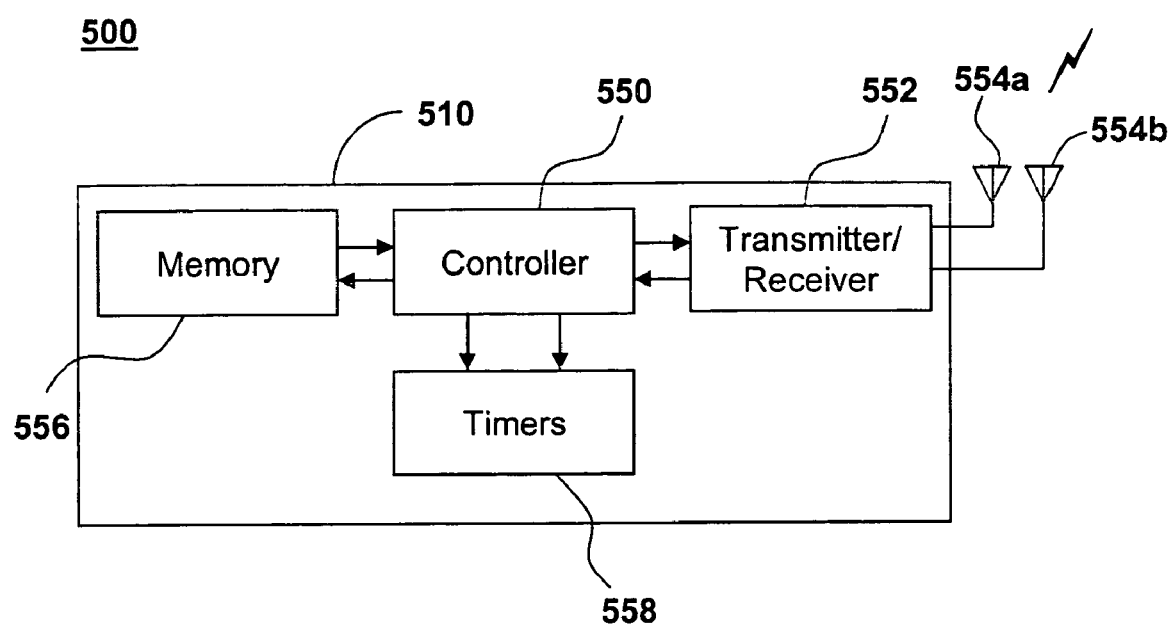
FIG. 5 is a block diagram of an enhanced passive scanning system for a wireless local area network, in accordance with one embodiment of the current invention.

FIG. 5 shows a block diagram of an enhanced passive scanning system for a wireless local area network, in accordance with one embodiment of the present invention at 500. Enhanced passive scanning system 500 includes a mobile station 510. Mobile station 510 includes a controller 550, a transmitter/receiver 552, a pair of diversified antennas 554a and 554b, a memory 556, and a set of timers 558. Running computer program code stored in memory 556, controller 550 directs transmitter/receiver 552 to receive beacon signals and GPRs. A site timing table entry in a site timing table stored in memory 556 may be updated based on the received beacon signals or GPRs. A scan start time may be set and stored in a set of timers 558. Based on the scan start time, mobile station 510 may determine a power mode and enter into a low-power mode when sufficient time is available before receiving the next beacon signal or GPR.

Figure 6:
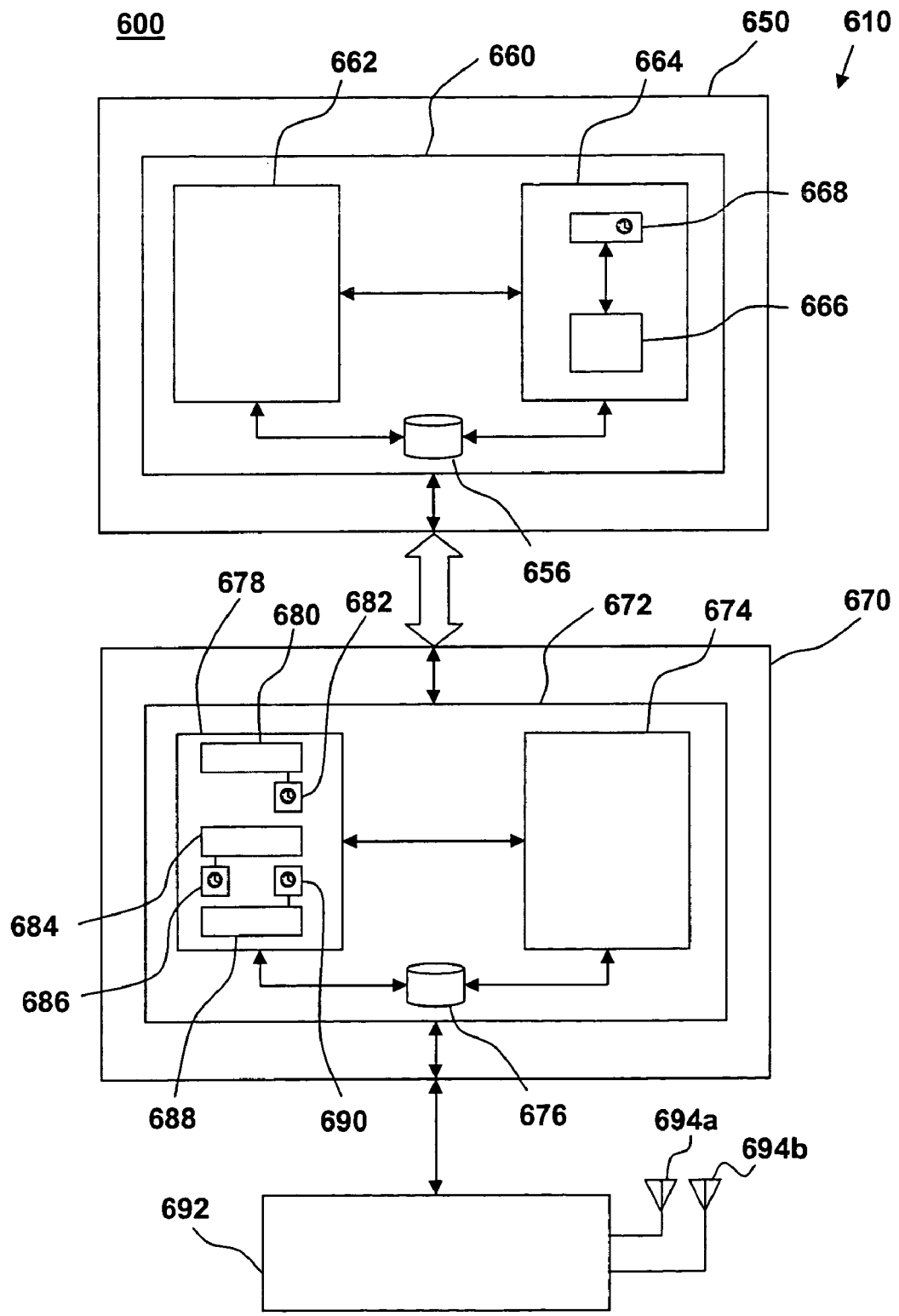
FIG. 6 is a block diagram of an enhanced passive scanning system for a wireless local area network, in accordance with another embodiment of the current invention.

FIG. 6 shows a block diagram of an enhanced passive scanning system for a wireless local area network, in accordance with another embodiment of the present invention at 600. Enhanced passive scanning system 600 includes a wireless communication device or mobile station 610. Mobile station 610 includes a host processor 650, a WLAN integrated circuit 670, and an 802.11a/b/g radio 692.

Host processor 650 may be a discrete or an embedded processor for controlling the execution of functions within mobile station 610. In one example of a function, host processor 650 drives WLAN integrated circuit 670 according to computer program code for enhanced passive scanning stored in a memory 656. A portion of this code, the WLAN IC driver 660, drives WLAN integrated circuit 670 accordingly for executing a beacon signal and GPR processing function 662 and for performing other functions such as an enhanced passive scanning function 664. Beacon signals and GPRs that are received by mobile station 610 may be processed by beacon signal and GPR processing function 662, with the processed results stored in a site timing table or a database within memory 656.

An EPS scheduler 666 run by host processor 650 as part of WLAN IC driver 660 generates an EPS schedule based on site timing table entries stored within memory 656. In one example, the EPS schedule includes a channel number, a local scan start time, and a maximum channel scan time for each site timing table entry in the site timing table. An EPS scan start timer 668 may be used to store a timer value corresponding to a target beacon transmission time or a target GPR transmission time. The timer may be located in an internal register, internal memory, external memory, or other suitable memory location.

Host processor 650 interfaces with WLAN integrated circuit 670 using a 16-bit generic slave interface or other suitable interface such as USB, a serial interface, an RS232 interface, a parallel interface, or a memory-mapped interface, according to appropriate protocols.

WLAN integrated circuit 670, such as the TNETW1220 or TNETW1230 integrated circuit manufactured by Texas Instruments, Inc., includes an embedded central processing unit (CPU) 672 that controls functions being executed such as baseband processing and interfacing functions between WLAN integrated circuit 670 and host processor 650. For example, a frame process module 674 may receive beacon signals and GPRs and store the results in a memory 676. Memory 676 may be used to buffer beacon signal, probe response, and GPR frames. An EPS process module 678 may receive information from WLAN IC driver 660 to execute an EPS process. An EPS schedule process module 680 stores timing synchronization function (TSF) timer information from a serving AP into a local TSF timer 682. A power management process module 684 determines when to enter a low-power mode by setting a low-power timer 686, entering the low-power mode, and waking up when low-power timer 686 expires. Radio control module 688 receives a channel number and tunes radio 692 according to a local scan start time up to a maximum channel scan time. A channel scan timer 690 may be set by radio control module 688 corresponding to the scan time computed to receive a beacon signal or a GPR. When a beacon signal or GPR is received, radio control module 688 may direct radio 692 to scan another channel. Radio transmissions are sent and received with a pair of diversified antennas 694a and 694b.

Passive scanning is performed by host process 650 with WLAN IC driver 660, in coordination with WLAN integrated circuit 670 and radio 692. In one example, the driver sends a passive scan command with a list of channels to firmware residing within WLAN integrated circuit 670. The firmware tunes radio 692 to a selected channel that is supported by mobile station 610. The firmware programs channel scan timer 690 with the maximum time to scan while on the selected channel. Radio 692 listens for beacon signals until a beacon signal is received or time runs out. When a beacon signal is received, the firmware sends beacon frame information to the driver and the driver records AP site timing information. Each channel in the list is scanned in turn, and an AP is selected from available access points.

The driver can dynamically change the value of channel scan timer 690 for each channel to improve the performance of the passive scan. The amount of channel scan time may be calculated by using the timing information from the TSF timer received with the beacon signal from each AP and the local TSF time or local station timestamp stored in local TSF timer 682 in mobile station 610. The calculation may consider jitter in the beacon signal or GPR. The sequence begins by the driver initiating an active scan to populate the site timing table that includes the channel number, BSSID, access-point timestamp (TSF timer from the AP), and local station timestamp. At the neighboring AP scan rate, the driver initiates an EPS. The driver reads the local station timestamp value to calculate the length of time for a passive scan to receive a beacon signal or GPR from the first AP in the site timing table. The driver commands the firmware to perform a passive scan. The driver receives beacon signals and GPRs from APs within range. The driver proceeds in this manner until all AP site timing table entries have been scanned. As the beacon signals or GPRs are received, the timing information is updated in the site timing table.

Another enhancement to passive scanning, the driver waits until the beacon signal or GPR is near to issue an EPS scan command. The value of channel scan timer 690 is set to a constant value for all channels. The amount of time to wait is calculated by using the timing information from each access-point timestamp and the local station timestamp. The calculation may take into account jitter in the beacon signal or GPR. The sequence begins by the driver initiating an active scan to populate the site timing table that includes a channel number, BSSID, access-point timestamp, and local station timestamp. At the neighboring AP scan rate, the driver initiates an EPS. The driver then reads the local timestamp and access-point timestamp to determine when to send an EPS scan command to the firmware. The driver receives the beacon signal or GPR. The driver proceeds in this manner until all access points in the site timing table have been scanned. As beacons signals or GPRs are received, the timing information in the site timing table is updated.

To perform an enhanced passive scan, the driver programs EPS scan start timer 668. When EPS scan start timer 668 expires, the driver creates and sends an EPS command to the firmware. In an exemplary EPS command, the driver sends the number of APs to scan, the EPS schedule for the number of APs to scan, the channel number of AP to scan, the AP scan start time in local TSF timer units, and the maximum scan time to listen for a beacon signal or a GPR. The driver orders the EPS command in chronological order of expected beacon signal or GPR reception times for neighboring APs.

For each access point within range of mobile station 610, the firmware computes the amount of time remaining before an AP scan start time. If enough time exists to enter a low-power mode, the firmware programs low-power timer 686. The firmware enters the low-power mode until low-power timer 686 expires, then exits the low-power mode. The firmware tunes radio 692 to a selected channel, programs AP channel scan timer 690, and listens for beacon signals or GPRs until channel scan timer 690 expires or a beacon signal or GPR is received. While the EPS is in progress, the firmware buffers the received beacon signal and GPR frames, and may send an unsolicited information message to the driver indicating the scan is complete. After all APs are scanned, the driver receives buffered beacon signal and GPR frames for parsing and processing. The driver then updates the site timing table with the received information, selects an appropriate access point, and programs EPS scan start timer 668 with the time remaining until the next EPS scan.

When performing an EPS, the driver may receive a packet for transmission. In this case, the driver determines the type of packet. For a voice packet, the driver sends the packet to the firmware for transmission. The firmware pauses the EPS for the entire duration of the voice frame exchange sequence. Upon completion of the sequence, the firmware resumes the EPS. The firmware may not be able to resume the EPS with the next neighboring AP when the voice frame exchange sequence is extended due to retransmissions. For data packets, the driver may hold the low priority packets until an unsolicited information message is received from the firmware indicating the EPS is complete. When a high priority data packet is received from the driver, the firmware may abort the EPS and transmit the packet. In the event the EPS is aborted by the firmware, the driver can determine which neighboring APs were not scanned and reschedule the EPS.

Figure 7:
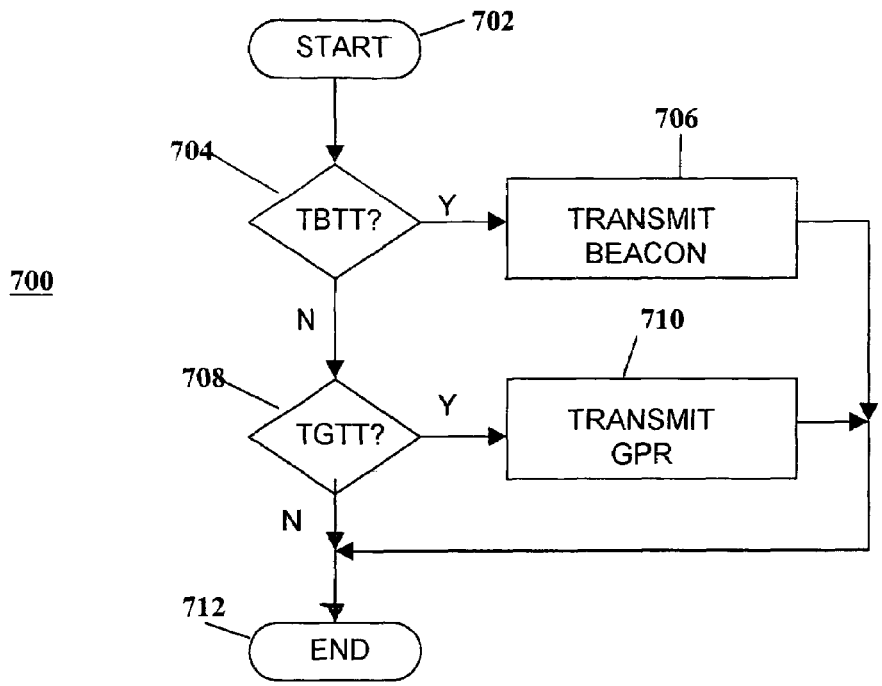
FIG. 7 shows a flow chart diagram of a method for providing enhanced passive scanning for mobile stations in the service area of a WLAN access point, in accordance with one embodiment of the invention.

Referring now to FIG. 7, there is shown a flow chart diagram 700 of a method of providing enhanced passive scanning for mobile stations in the service area of a WLAN access point, in accordance with one embodiment of the invention. At the start 702, the access point checks a beacon interval timer to determine first if a target beacon transmit time (TBTT) has arrived. If so, then the access point transmits a full beacon signal (706), including in the beacon signal the beacon information, such as, for example, timer information, beacon interval information, BSSID, and TIM. The timer information may be the TSFtimer information as specified by the 802.11 specifications. Preferably the access point uses its high priority status to transmit the beacon so that the beacon occurs in the channel as close as possible to the TBTT as mobile stations may have come out of low power state to receive the beacon signal.

If the AP timer indicates it is not time to transmit a beacon signal, the AP determines if it is time to transmit a supplemental beacon signal, such as a gratuitous probe response (708). If so, then the AP commences acquiring the channel and transmitting the supplemental beacon signal (710). The supplemental beacon signal contains a subset of the information that is normally transmitted in the regular beacon signal, such as timer information without a TIM, supplemental beacon interval, and the BSSID, for example. Generally the supplemental beacon requires significantly less channel time compared to the full beacon signal. If no beacon signal or supplemental beacon is transmitted, then the process is finished (712).

In general it is preferred that the supplemental beacon signal be transmitted substantially more often than the beacon. In one embodiment of the invention, the TBTT is determined by comparing the TSFtimer against the beacon interval, and if the modulo equals 0, then the TBTT has arrived and a full beacons should be transmitted. Similarly, if the TSFtimer modulo the supplemental beacon interval, the TGTT has arrived, and a supplemental beacon should be transmitted.

Figure 8:
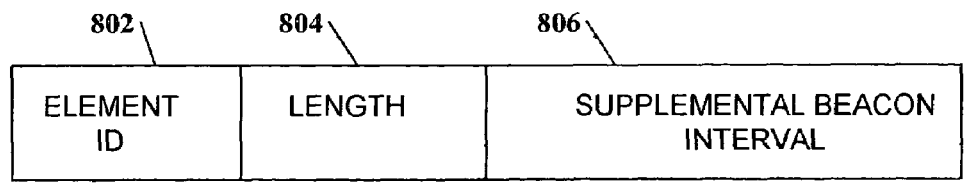
FIG. 8 shows a supplemental beacon information element diagram for providing mobile stations with information regarding supplemental beacon signals.

Referring now to FIG. 8, there is shown a supplemental beacon information element diagram 800. In one embodiment of the invention an access point supporting the dual-mode beacon function of beacon signals and supplemental beacon signals includes this information element in both beacon types. The element ID 802 is a unique identification number for the supplemental beacon element, which used to distinguish the supplemental beacon element from other valid information elements present in a beacon or GPR frame, such as the supported rate field or country code. The length field 804 specifies the number of octets in the supplemental beacon field. The supplemental beacon field 806 is an information field that provides timing information regarding the frequency of occurrence of the supplemental beacon signals so that mobile stations can adjust their timers to receive the supplemental beacon signals when they occur. The presence of the supplemental beacon field in a GPR or beacon frame indicates to a mobile station that enhanced passive scanning is supported within the service area of the WLAN access point issuing the beacon or GPR frames with the supplemental beacon field.

Therefore, the invention provides an enhanced passive scanning method for a wireless local area network. The method commences by transmitting beacon signals at a beacon interval from an access point. Each beacon containing a beacon information set. The beacon information set includes, for example, time stamp information such as a copy of the access point's present TSFtimer value. The beacon information set may also include beacon interval information, basic service set identifier (BSSID), and TIM and DTIM information. The method also includes transmitting gratuitous probe response signals, which are supplemental beacons, at a gratuitous probe response interval, and containing a subset of the beacon information. The gratuitous probe response signals are transmitted at gratuitous probe response intervals, which is shorter than the beacon interval. As a result, a plurality of gratuitous probe response signals are transmitted between successive beacon signals, each one containing a subset of the beacon information, such as an access-point timestamp, a gratuitous probe response interval, and a basic service set identifier, but excluding the lengthy TIM and DTIM information. The beacon signal and the gratuitous probe response signals may be transmitted from either a mobile station or an access point. It is contemplated that a delivery traffic information message count may be provided in a beacon signal for indicating how many beacons, including the present beacon, appear before the next delivery traffic information message.

The invention also provides a method for facilitating enhanced passive scanning by mobile stations in a WLAN by an access point, commencing at the AP by determining the occurrence of either a target beacon transmit time or an target gratuitous probe response time. In response, the AP commences transmitting a beacon signal if the target beacon transmit time occurs, or transmitting a gratuitous probe response signal if the target gratuitous probe response time occurs. It is contemplated that the AP may commence either transmitting either signal by acquiring the channel using a high priority transmission. It is contemplated that determining the occurrence of the target beacon transmit time occurs when the modulo of the TSFtimer and the beacon interval is zero. Likewise, determining the occurrence of the target gratuitous probe response time occurs when the modulo of the TSFtimer and the supplemental beacon interval is zero. The invention also provides for both the beacon signal and gratuitous probe response signals to contain a supplemental information element, including an element identifier field, length field, and supplemental beacon interval field.

In addition the invention provides a method of indicating to a mobile wireless local area network device that an access point supports supplemental beaconing by transmitting from the access point a beaconing signal. By beaconing signal it is meant either a beacon signal or a gratuitous probe response signal, both of which include a supplemental beacon field. The mobile device commences receiving the beaconing signal, and upon detection of the supplemental beacon field, learns that the AP supports supplemental beaconing.

While the embodiments of the invention disclosed herein are presently preferred, various changes and modifications can be made without departing from the spirit and scope of the invention. The scope of the invention is indicated in the appended claims, and all changes that come within the meaning and range of equivalents are intended to be embraced therein.

What is claimed is:

1. An enhanced passive scanning method by a wireless device for a wireless local area network, comprising:
    transmitting by the wireless device, beacon signals at a beacon interval, each beacon containing a beacon information set; and
    transmitting by the wireless device, gratuitous probe response signals at a gratuitous probe response interval containing a subset of the beacon information, the gratuitous probe response signals transmitted at a gratuitous probe response interval, the gratuitous probe response interval being shorter than the beacon interval such that a plurality of gratuitous probe response signals are transmitted between successive beacon signals, and containing a subset of the beacon information.

2. The method of claim 1 wherein the wireless device is at least one of a mobile station or an access point.

3. The method of claim 1 wherein the beacon signal includes an access-point timestamp, a beacon interval, a basic service set identifier, and a traffic indication map element.

4. The method of claim 1 wherein the gratuitous probe response signal includes an access-point timestamp, a gratuitous probe response interval, and a basic service set identifier.

5. The method of claim 1 wherein the beacon interval is 100 milliseconds.

6. The method of claim 3 wherein the beacon signal further comprises delivery traffic information message count for indicating how many beacons, including a present beacon, appear before the next delivery traffic information message.

7. The method of claim 3 wherein a delivery traffic information message is included in each beacon signal wherein the corresponding delivery traffic information message count has a zero value.

8. A method for facilitating enhanced passive scanning by mobile stations in a WLAN by an access point, comprising:
    determining by the access point, the occurrence of one of a target beacon transmit time and a target gratuitous probe response time;
    transmitting by the access point, a beacon signal if the target beacon transmit time occurs; and
    transmitting by the access point, a gratuitous probe response signal if the target gratuitous probe response time occurs.

9. A method for facilitating enhanced passive scanning as defined in claim 8, wherein transmitting the beacon signal comprises acquiring the channel using a high priority transmission.

10. A method for facilitating enhanced passive scanning as defined in claim 8, wherein determining the occurrence of the target beacon transmit time when the modulo of the TSFtimer and the beacon interval is zero.

11. A method for facilitating enhanced passive scanning as defined in claim 8, wherein determining the occurrence of the target gratuitous probe response time when the modulo of the TSFtimer and the supplemental beacon interval is zero.

12. A method for facilitating enhanced passive scanning as defined in claim 8, wherein the beacon signal includes an access-point timestamp, a beacon interval, a basic service set identifier, and a traffic indication map.

13. A method for facilitating enhanced passive scanning as defined in claim 8, wherein the gratuitous probe response signal includes an access-point timestamp, a gratuitous probe response interval, and a basic service set identifier.

14. A method for facilitating enhanced passive scanning as defined in claim 8, wherein both the beacon signal and gratuitous probe response signals contain a supplemental information element including an element identifier field, length field, and supplemental beacon interval field.

15. A method of indicating to a mobile wireless local area network device that an access point supports supplemental beaconing, comprising:
    transmitting from the access point a beaconing signal selected from one of a beacon signal and a gratuitous probe response signal, and including a supplemental beacon field in the beaconing signal, wherein the supplemental beacon field provides frequency of occurrence of the gratuitous probe response signals; and
    receiving the beaconing signal at the mobile wireless local area network device.

* * * * *